Sept. 30, 1969

H. BOLT 3,469,717

PIVOTAL PLATFORM AND SLIDABLE RAMP PARKING DEVICE

Filed Aug. 24, 1966

Sept. 30, 1969  H. BOLT  3,469,717
PIVOTAL PLATFORM AND SLIDABLE RAMP PARKING DEVICE
Filed Aug. 24, 1966  7 Sheets-Sheet 2
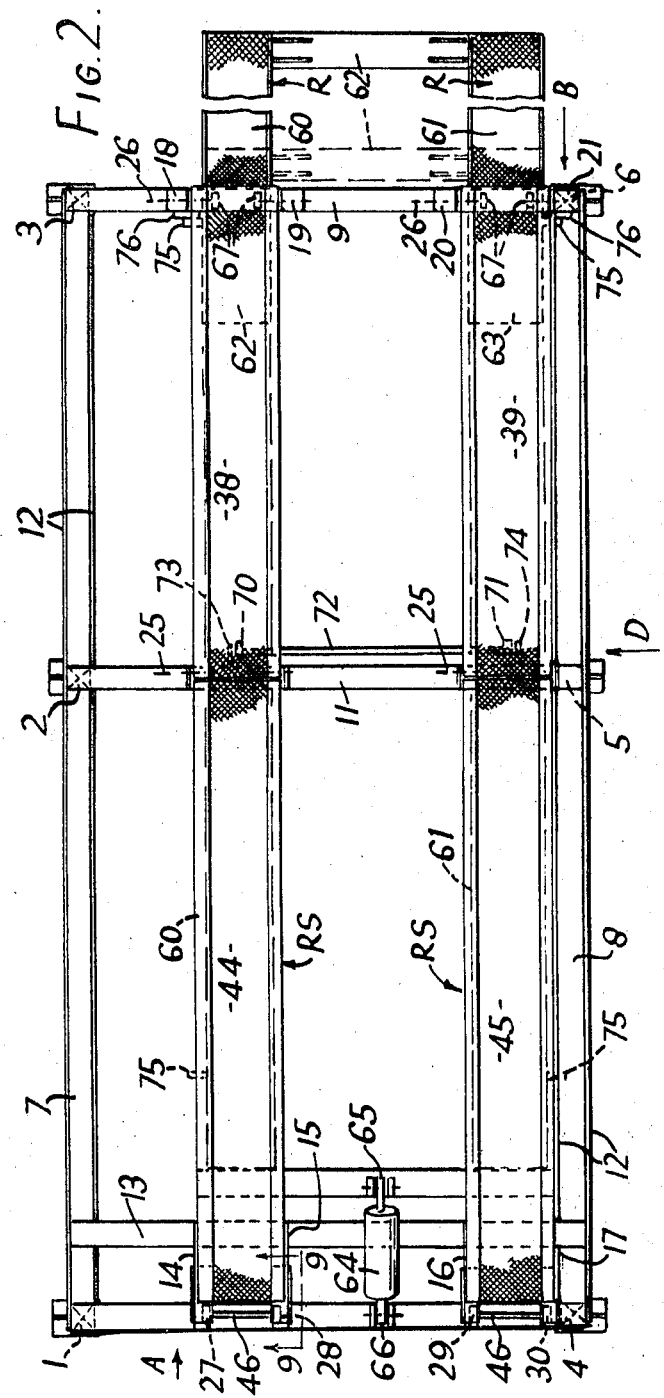

Sept. 30, 1969            H. BOLT            3,469,717
PIVOTAL PLATFORM AND SLIDABLE RAMP PARKING DEVICE
Filed Aug. 24, 1966            7 Sheets-Sheet 3
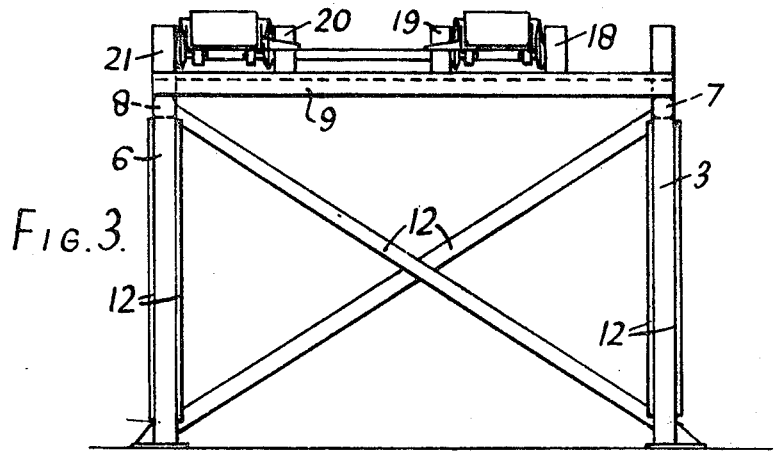
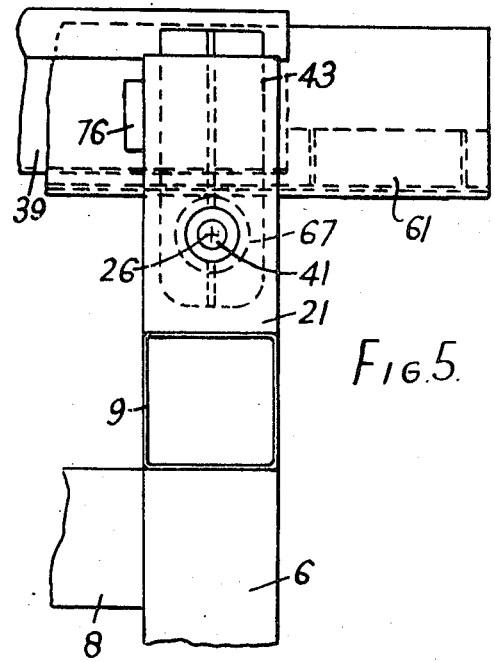

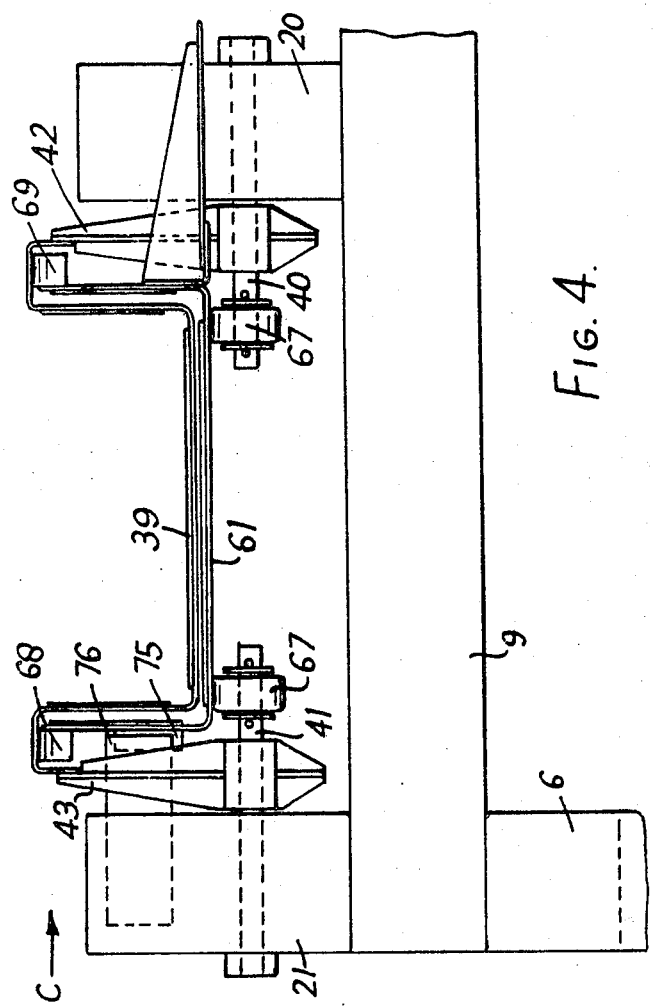

Sept. 30, 1969  H. BOLT  3,469,717
PIVOTAL PLATFORM AND SLIDABLE RAMP PARKING DEVICE
Filed Aug. 24, 1966  7 Sheets-Sheet 5
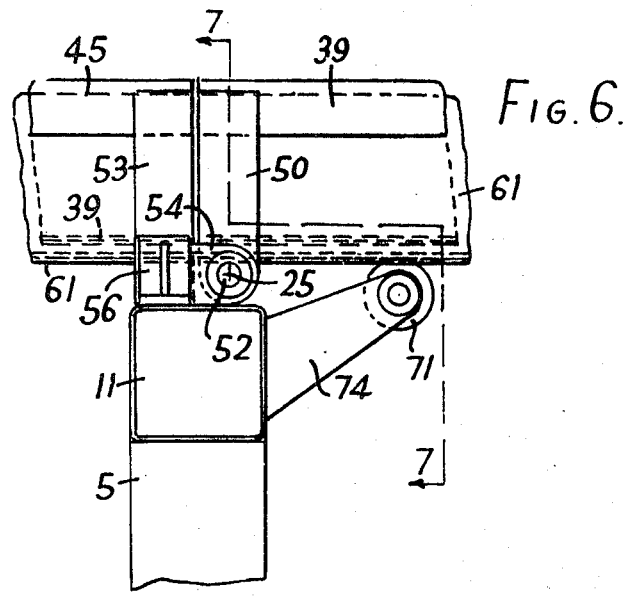
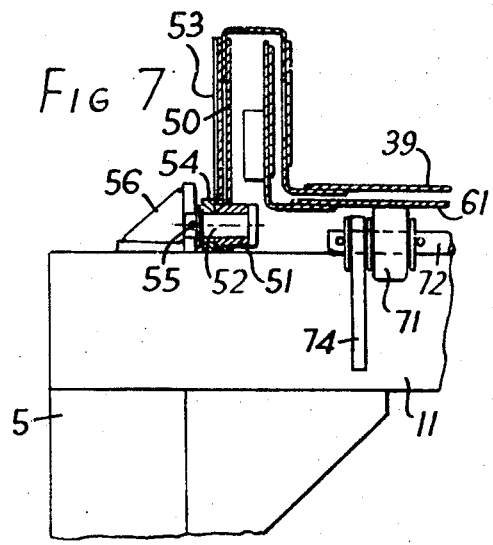

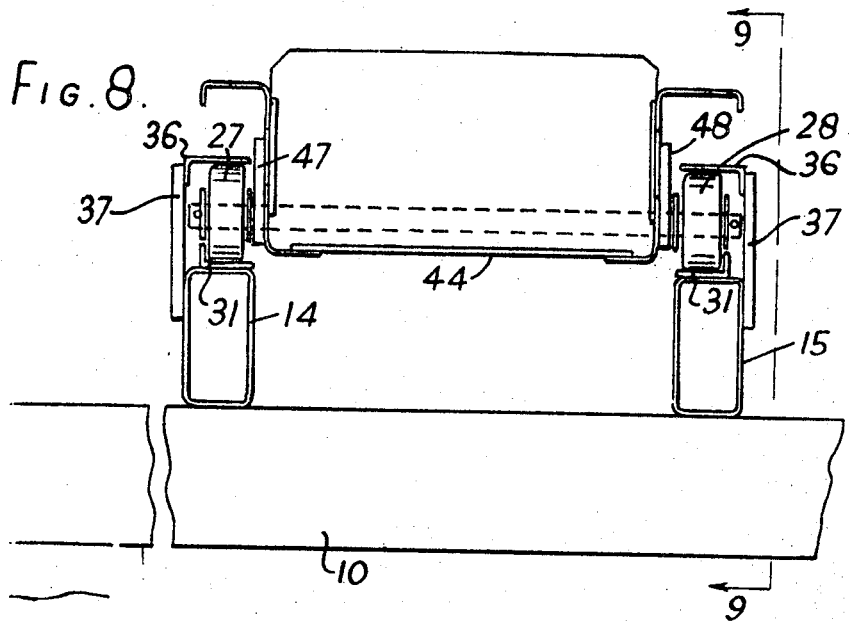
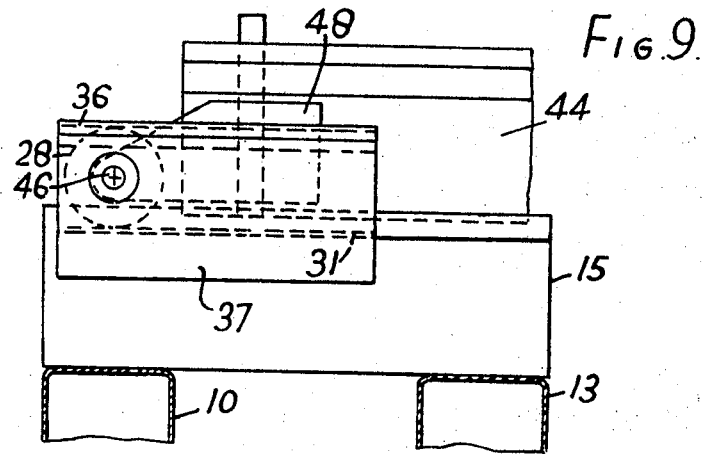

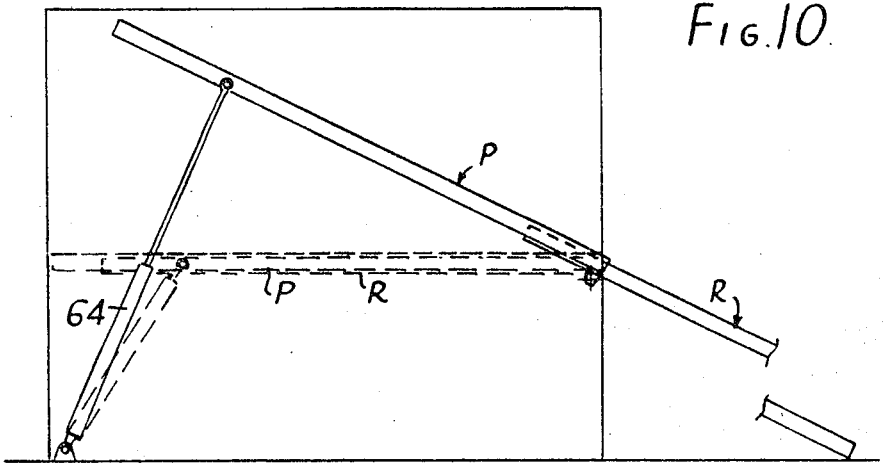
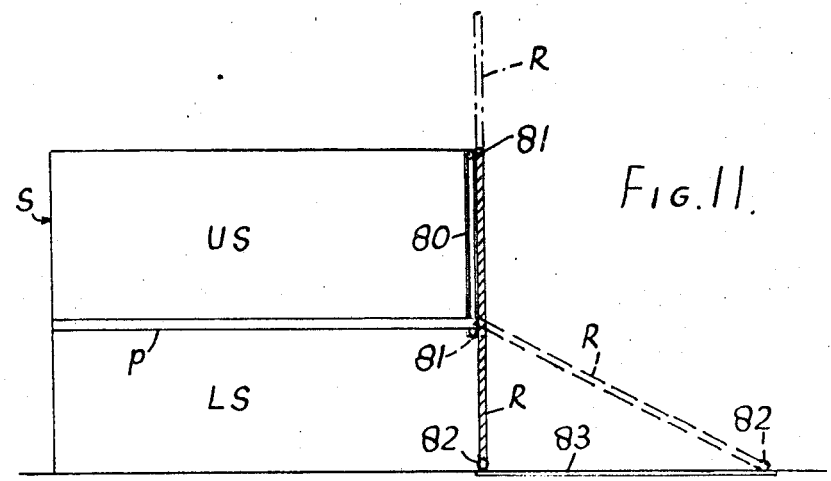
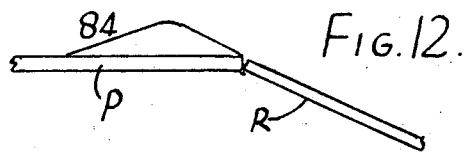

United States Patent Office 3,469,717
Patented Sept. 30, 1969

3,469,717
PIVOTAL PLATFORM AND SLIDABLE
RAMP PARKING DEVICE
Harold Bolt, 2 Vernon Ave., Peachaven, England
Filed Aug. 24, 1966, Ser. No. 574,720
Claims priority, application Great Britain, Sept. 4, 1965,
37,895/65
Int. Cl. E04h 6/00
U.S. Cl. 214—16.1                                   8 Claims

ABSTRACT OF THE DISCLOSURE

A vehicle parking structure which permits optimum use of the area available for parking. A raised platform, high enough to provide parking beneath it has a forward section and a pivotally connected rear section, the forward section being pivoted to the supporting framework about an axis close to one end of that section and having mounted beneath it a ramp which can be slid out and lowered to pivot the forward section upwardly to permit a vehicle to be driven up the ramp and to pass over the axis to cause the forward section to pivot downwardly so that the platform assumes a horizontal position.

---

This invention relates to vehicle parking structures and it is an object of the invention to provide an economical method of increasing the parking space available in a pre-determined ground area.

The invention consists of a vehicle parking structure wherein access is provided to an upper parking platform forming part of the structure by way of a ramp incorporated in the structure and movable therein to and from an operational position in which it leads upwardly and at an inclination to the horizontal from the ground to said platform.

The invention includes such a vehicle parking structure designed for two-story parking, the height of the platform being such that a vehicle can be conveniently accommodated below it.

According to a generally preferred form of the invention the ramp when not in use occupies a stowage position immediately below the platform.

In this case, the construction is preferably one in which the ramp is mounted for movement in its own plane to and from the operational position and the platform is divided intermediate its ends into a front section which is pivoted to the framework of the structure for tilting movement bodily with the ramp as the latter is brought to and from operational position, about an axis located in the vicinity of the forward end of the section, and a rear section which is hinged to the front section along the rear end thereof so as to follow the tilting movements of the front section, the rear end of the rear section being supported on runners along which it moves as the section follows said tilting movements.

With such a construction (which will be hereinafter called the preferred construction) the ramp is first drawn out to its fullest extent, which is preferably defined by stops. The forward end of the drawn out ramp is then lowered to the ground, causing the front platform section, bodily with the ramp, to tilt about its pivot axis, the rear section of the platform following such tilting movement of the front section. The vehicle is thereupon driven up the ramp onto the front platform section, which under these conditions forms with the ramp a substantially continuous plane surface. When the centre of gravity of the vehicle has passed the pivot axis of the front platform section the latter, bodily with the ramp, will tilt in the reverse direction, raising the front end of the ramp and simultaneously lowering the rear end of the front platform section, the rear platform section being returned to its initial position of alignment with the front section. The vehicle can now be driven to the rear end of the platform and the ramp pushed back to stowage position beneath the platform. In the reverse operation, of removing the vehicle from the parking structure, the ramp is again drawn out to its fullest extent. The vehicle is then driven onto the ramp. When the centre of gravity of the vehicle has passed the pivot axis of the front platform section the latter, bodily with the ramp, will tilt in the direction to lower the ramp into contact with the ground at its forward end, the rear platform section following the tilting movement of the front section. When the ramp has fully reached the ground, at its forward end, the vehicle can be driven off the ramp.

According to a possible alternative construction the arrangement may be one wherein the ramp is mounted for movement in its own plane to and from the operational position and the platform is pivoted to the framework of the structure for tilting movement as a whole, bodily with the ramp as the latter is brought to and from the operational position, about an axis located in the vicinity of the forward end of the platform.

With either of the foregoing constructions, viz., the preferred construction and the possible alternative construction, the difficulty is readily avoided, of parts of the underside of the vehicle fouling the top of the ramp as the vehicle is being driven onto the platform from the ramp, or in the reverse operation of driving the vehicle from the platform onto the ramp, the front end of the platform or front platform section (preferred construction)—due to excessive inclination of the ramp, i.e., in the case of a construction (which also is possible) in which the platform is fixed. In this connection it may be remarked that the length of the platform is preferably only slightly greater than the length of the longest vehicle to be parked thereon and in order that the ramp may occupy when not in use a stowage position below the platform, as above described, it is preferable that the length of the ramp should not exceed, at any rate to any substantial extent, the length of the platform. With such relative lengths of the platform and the ramp it may happen (i.e., with a construction in which the platform is fixed) that the inclination of the ramp is excessive, with the consequence above visualised of fouling of the vehicle with the platform or the ramp.

With the preferred construction, and similarly with the foregoing possible alternative construction, the arrangement is advantageously one wherein means are provided for damping the tilting movements of the platform, or as the case may be, the tilting movements of the front platform section and the following movements of the rear platform section, thereby causing said movements to take place slowly. If desired, the arrangement may be one in which the action of the damping means increases progressively as the centre of gravity of the vehicle moves further and further away from the axis of tilting of the platform, or platform section.

The platform may consist either of a single member of the full width of the platform, or of two members, e.g., of channel section, spaced apart at such a distance that they can carry the wheels of a vehicle.

Similarly, in order to reduce weight the ramp will normally consist of two channel section members, preferably joined by at least one cross member to facilitate movement of the ramp to and from its operative position.

Although, as in the preferred construction and similarly in the alternative constructions visualised above, the ramp, bodily with the front platform section, or as the case may be, the platform as a whole, is tilted automatically, under the weight of the vehicle, an arrangement can be employed in which the tilting is effected manually.

The accompanying drawings illustrate the invention, by way of example.

In these drawings:

FIGURE 1 is a side view of a parking structure in accordance with this invention, the view illustrating the preferred construction hereinbefore referred to;

FIGURE 2 is a corresponding plan view;

FIGURE 3 is a corresponding end view looking in the direction of arrow A in FIGURES 1 and 2;

FIGURE 4 is a fragmentary end view of the right hand near side corner of the structure (as seen in FIGURE 2) looking in the direction of arrow B in FIGURE 2;

FIGURE 5 is a fragmentary side view of the same corner, looking in the direction of arrow C in FIGURE 4;

FIGURE 6 is a fragmentary side view of the centre near side stanchion of the structure, looking in the direction of arrow D in FIGURE 2, the view showing the details of the hinge connection between the two sections of the platform;

FIGURE 7 is a section through FIGURE 6, generally on section line 7—7;

FIGURE 8 is a fragmentary end view of the left hand far side corner of the structure (as seen in FIGURE 2), looking in the direction of arrows A in FIGURES 1 and 2;

FIGURE 9 is a section through FIGURE 8, on section lines 9—9 in FIGURES 8 and 2;

FIGURE 10 illustrates, purely diagrammatically, an alternative construction hereinafter described;

FIGURE 11 illustrates, also purely diagrammatically, another alternative construction hereinafter described; and FIGURE 12 illustrates a modification, also hereinafter described.

Like reference letters and numerals are generally used to denote like parts in the various figures.

Figure 1:
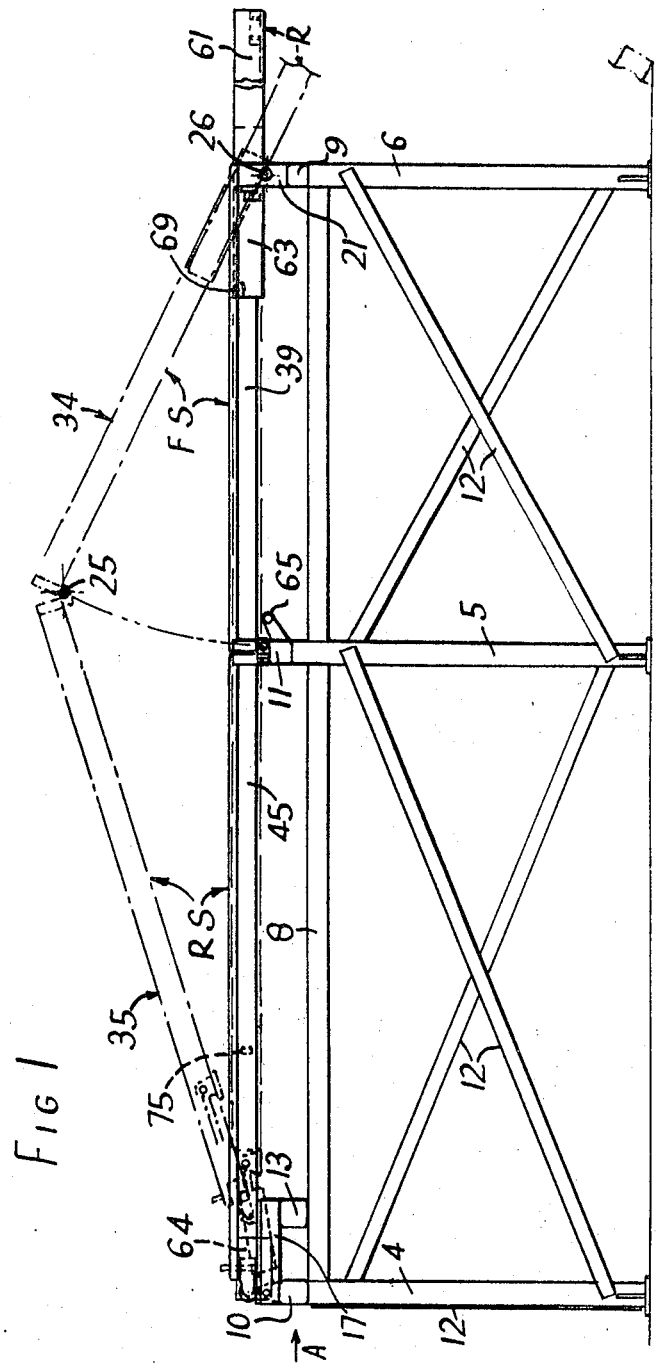

Referring first to FIGURES 1 to 9, the parking structure there shown comprises, as regards the rigid framework of the structure, six vertical stanchions 1, 2, 3, 4, 5, 6 located at the positions clearly shown in the figures.

These stanchions are rigidly joined by horizontal side members 7, 8, by a front horizontal cross-member 9 at the forward end of the framework, by a rear horizontal cross-member 10 at the rear end of the framework, by a centre horizontal cross-member 11 intermediate the two ends of the framework, all of these members 7, 8, 9, 10 and 11 being located as shown at or near the top of the framework, and by bracing members 12. The various side members, cross-members and bracing members are all welded to the stanchions so as to form together a rigid structure of ample strength and stability.

Extending across the framework near to the rear end thereof is a further cross-member 13 welded at the ends thereof to side members 7, 8, and spanning the space between cross-member 10 and this further cross-member 13 are four short carrier bars 14, 15, 16, 17 disposed longitudinally of the structure. These bars are welded to the cross-members 10, 13.

Upstanding from cross-member 9 and welded thereto are four short posts 18, 19, 20, 21.

Mounted upon the rigid framework of the structure described above is the upper parking platform, which in the illustrated embodiment is an articulated structure consisting of a front section generally marked FS and a rear section generally marked RS.

The two sections are hinged to one another for relative hinging movement about a horizontal axis 25 and the front section is pivoted to the rigid framework for tilting movement relative thereto about a horizontal axis 26.

The rear section is supported at the rear end thereof upon carrier bars 14, 15, 16, 17. It is so supported through the intermediary of rollers 27, 28, 29, 30 on the section running on guide rails 31 on the carrier bars (see FIGURES 8 and 9), the construction being thereby such that as the rear section follows the titlting movements of the front section (owing to the hinged connection of the sections to one another) the rollers travel along the guide rails to accommodate the forward movement of the section. The fully tilted position of the front section is shown in chain line at 34 and the fully inclined position of the rear section is shown in chain line at 35, in FIGURE 1.

Immediately above each roller 27, 28, 29, 30 and spaced a short distance therefrom is a flange member 36 carried on a check plate 37 welded to the relative bar 14, 15, 16 or 17. The purpose of these flange members is to retain the corresponding rollers in functioning position on the relative guide rails 31.

The front platform section consists of two mutually parallel trough-section members 38, 39 forming in effect wheel tracks for the vehicle to be parked on the platform, the floor portions of these members being formed of checker plate to enhance wheel grip.

Each of the members 38, 39 is pivotally mounted upon the relative pair of posts 18, 19 or 20, 21 of the rigid framework, so as to possess freedom for tilting movement relative to the framework between the normal (horizontal) position of the members and the tilted position shown in chain line at 34 in FIGURE 1. FIGURES 4 and 5 show the details of the pivotal connections.

As shown in these figures, each pivotal connection consists of a pair of pivot rods 40, 41 fixed in the relative posts 18, 19 or 20, 21. Rotatably mounted on these pivot rods are a pair of arms 42, 43 to which are affixed the relative wheel track member 38, or 39 so as to be tiltable as a unit therewith.

The rear platform section consists similarly of two mutually parallel trough-section wheel track members 44, 45, disposed in line respectively with the corresponding members 38, 39 of the front platform section. The floor portions of these members 44, 45 are also formed of checker plate to enhance wheel grip.

Wheel track member 44 carries rollers 27, 28 and wheel track member 45 rollers 29, 30, each roller pair being rotatably mounted on a carrier spindle 46 supported at the two ends thereof on carrier lugs 47, 48 welded to the side walls of the relative wheel track member.

The details of the hinged connection between the front and rear platform sections are illustrated in FIGURES 6 and 7.

As there shown, each wheel track member 38 or 39 of the front section has welded to it at each side of the member a lug 50 welded in turn to a cylindrical boss 51 through which extends with a freely revoluble fit a short headed hinge pin 52.

Each wheel track member 44 or 45 of the rear section has welded to it at each side of the member a lug 53 welded in turn to an arm 54 formed with a circular hole extending through it through which hinge pin 52 extends with a freely revolvable fit, the pin being retained in position axially relative to boss 51 and arm 54 by a split pin 55.

When the platform is in the normal position thereof it rests at the location of the hinged connection of the two platform sections upon cross member 11 of the rigid framework, through the intermediary of arms 54 the bottoms of which abut the upper face of cross member 11 when the platform is in this position—as clearly shown in FIGURES 6 and 7.

Again when the platform is in the normal position each pair of lugs 53 on the rear platform section is positioned snugly between a pair of locating brackets 56 welded to the upper face of cross member 11.

Slidably supported on the platform is the ramp, generally marked R in FIGURES 1 and 2.

The ramp consists of a mutually parallel pair of trough section wheel track members 60, 61 rigidly connected at the front end thereof by a cross member 62.

As shown clearly in FIGURES 4 and 5 and FIGURES 6 and 7, the two wheel track members 60, 61 are located immediately beneath the corresponding wheel track members 38, 39 of front platform section FS and the corresponding wheel track members 44, 45 of rear platform section RS, when the ramp is in its normal (non-operational) position, in which position it appears in broken line in FIGURES 1 and 2.

When the ramp is in use, it is drawn out from non-operational position beneath the platform sections to a position in which, as shown in FIGURES 1 and 2, only a short portion of the ramp, at its rear end, is still located beneath the front platform section. The length of this short portion of the ramp is determined to ensure that as the ramp is lowered to the ground (at its forward end), following the operation of drawing out the ramp to the full-line position in which it appears in FIGURE 1 (which operation is performed by hand), and similarly as the ramp is returned to horizontal (full-line) position, preparatorily to pushing it back to its non-operational position beneath the platform sections, there is sufficient interlock as between the ramp and the front platform section to cause these two parts to move as one about pivot axis 26. The short portions aforesaid of the ramp are marked 62, 63 in FIGURES 1 and 2.

The ramp is pulled out from its non-operational position to the horizontal position and also pushed back to the non-operational position by hand. It is also lowered by hand if there is no vehicle on the platform, i.e. if a vehicle is to be parked on the platform. If however a vehicle is on the platform and is required to be driven off the platform to the ground (via the ramp) the weight of the vehicle lowers the ramp as soon as the centre of gravity of the vehicle has passed the pivot axis 26, the length dimension of the rear platform section being so determined, relative to the design of the vehicle or vehicles that will normally be parked on the platform, that the wheels of the parked vehicle that were initially (i.e. in the parked position of the vehicle) on the rear platform section will have travelled onto the front platform section before the centre of gravity of the vehicle has reached said pivot axis—thereby ensuring that before any lowering movement of the ramp takes place the vehicle will be suported on a substantially continuous surface which is plane from end to end, namely the combined surface of the ramp and the front platform section. Upon completion of the lowering movement of the ramp the vehicle can be driven off the ramp onto the ground, whereupon, if desired the ramp can be returned to non-operational position by hand, being in this case first raised to the horizontal (drawn out) position by hand and then pushed in, again by hand, to the non-operational position.

If a vehicle is to be parked on the platform the ramp is first brought to operational position by the procedure described above. The vehicle is then driven onto the ramp. As soon as the centre of gravity of the vehicle has passed pivot axis 26 the ramp, as a unit with the front platform section, commences to rise under the weight of the vehicle, causing the platform sections to move down to their respective normal (horizontal) positions on the rigid framework. Upon completion of this downward movement of the platform sections the vehicle can be driven entirely off the ramp, whereupon the ramp can be pushed back again to non-operational position.

In order to reduce the speed at which the unit comprising the ramp and the front platform section move in their upward and downward movements under the weight of the vehicle, a double-acting dashpot device 64 is provided, operating between a pivotal connection 65 on the rear platform section and a pivotal connection 66 on cross member 10 of the rigid framework.

When the ramp is in the fully drawn out position it is supported partly by rollers 67 freely revoluble on pivot rods 40, 41 and partly by the front platform section, the latter affording its support in a downward direction through the intermediary of a pair of upwardly curved dogs 68, 69 on each of the wheel track members 60 and 61 of the section.

As the ramp is pushed in it is still supported partly by the rollers 67 and partly by the front platform section, until a point is reached in the inward movement of the ramp when under its own weight it commences to tilt downwardly at the rear end into engagement with a pair of rollers 70, 71 (see FIGURE 2) freely rotatable on a common carrier spindle 72 mounted at the two ends thereof on a pair of supporting brackets 73, 74 welded to the forwardly presented face of cross member 11 of the rigid framework. From this point on, in the inward movement of the ramp, the latter receives support solely from the rigid framework, through rollers 67 and rollers 70, 71, the rear half of the ramp virtually overhanging the rollers 70, 71.

In order to limit the outward movement of the ramp stops 75 are affixed to the sides of the ramp near to the rear end thereof, said stops being co-operable with fixed stops 76 on posts 18, 21.

Finally as to the embodiment illustrated in FIGURES 1 to 9, it will be seen that a space 77 is left between the platform and the rigid framework on one side of the structure. This space is to afford access, e.g., by way of a ladder, to and from a parked vehicle on the platform.

Referring to the construction illustrated in FIGURE 10, the sole difference, in principle, between this construction and the earlier construction, of FIGURES 1 to 9, is that the platform P is a unitary member, in contrast to being an articulated structure as in the embodiment of the earlier figures. Apart from this characteristic, constructional details can be substantially the same in the two constructions, i.e., as regards the ramp R, the platform P and the rigid framework.

FIGURE 11 illustrates a construction, suitable for use, for example, in a garage, in which the ramp R serves, when not in use as a ramp, as a door common to two spaces US and LS located respectively above and below an upper parking platform P, the ramp being so mounted as to be movable both in its own plane between a lowered position (in which it appears in full lines) in which lowered position it closes both of said spaces US and LS, and a raised (chain-line) position in which it opens at least the lower space LS, and also along a curved path in which (a) its upper end travels rectilinearly substantially in the plane of the front of the structure S embodying the parking platform and (b) its lower end travels rectilinearly in a horizontal plane, the movement along said curved path being performed when the ramp is being brought to or from its operational (ramp forming) position.

In the embodiment shown, the ramp is guided in said movements by vertically disposed guide rails 80 on the structure incorporating the parking platform, co-operating with upper rollers (or the equivalent) 81 and the lower rollers 82 on the ramp. If desired rollers 82 may run on tracks 83 in fixed relation to structure S.

The modification illustrated in FIGURE 12 consists in arranging humps 84 on the wheel tracks of the upper parking platform P adapted to raise the vehicle slightly as it is driven onto or off the platform or from, or onto, the ramp R, sufficiently to avoid any fouling of the underside of the vehicle with the platform or ramp. As will be understood this provision is only necessary when the platform is a fixture.

Lastly, it may be remarked that the parking structure of FIGURE 1 to 9 and similarly the parking structure of FIGURE 10 will usualy be installed in a garage or other building enclosing it. On the other hand it may be unenclosed or only partially enclosed in a building.

What is claimed is:

1. A vehicle parking structure comprising a framework, a platform, said platform comprising a forward section and a rear section, said forward section being pivotally connected with said framework at a location adjacent to an end thereof, a ramp slidably mounted beneath said forward section for movement outwardly from said end, said forward section being pivotally connected at its other end to said rear section whereby when said ramp is slid outwardly from beneath said platform and the opposite end of said ramp is lowered to ground level, a vehicle may be driven up said ramp until the center of gravity of said vehicle passes over said location to cause said forward section to pivot downwardly so that the rear section pivots with respect to said forward section to assume a horizontal position along with said forward section and said ramp.

2. The vehicle parking structure defined in claim 1 wherein said platform is supported by said framework at a sufficient height to permit a vehicle to be parked beneath it.

3. The vehicle parking structure defined in claim 1 wherein said forward and said rear sections, each comprise a pair of parallel track members.

4. The vehicle parking structure defined in claim 3 wherein said track members are each substantially U-shaped in cross section to provide side walls to retain therebetween the wheels of said vehicle when said vehicle is driven over said track members.

5. The vehicle parking structure defined in claim 1 wherein the end of said rear section which is not pivoted to said forward section is horizontally slidable with respect to said framework.

6. The vehicle parking structure defined in claim 5 wherein said rear section has rollers which are rotatably mounted thereon to roll over said framework.

7. The vehicle parking structure defined in claim 6 further comprising means connected between said framework and said rear section for dissipating the energy generated about said location by said vehicle.

8. The vehicle parking structure defined in claim 7 wherein said means is a dashpot.

References Cited

UNITED STATES PATENTS

| | | | |
|---|---|---|---|
| 1,442,769 | 1/1923 | Jackson et al. | 296—1 X |
| 1,987,376 | 1/1935 | Stearns | 214—16.1 |

GERALD M. FORLENZA, Primary Examiner

R. B. JOHNSON, Assistant Examiner